US008798260B2

(12) United States Patent
Smith et al.

(10) Patent No.: US 8,798,260 B2
(45) Date of Patent: *Aug. 5, 2014

(54) DELIVERY OF ALARM SYSTEM EVENT DATA AND AUDIO

(75) Inventors: Jeffery O. Smith, Dallas, TX (US); Michael Gregory, Carrollton, TX (US); Tomás Murray, Atlanta, GA (US); Eugene D. Ary, Flower Mound, TX (US)

(73) Assignee: Numerex Corp., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,941

(22) Filed: Apr. 4, 2012

(65) Prior Publication Data

US 2012/0250834 A1    Oct. 4, 2012

Related U.S. Application Data

(60) Provisional application No. 61/471,569, filed on Apr. 4, 2011.

(51) Int. Cl.
*H04M 11/04* (2006.01)

(52) U.S. Cl.
USPC ........................................ 379/455; 455/404.1

(58) Field of Classification Search
USPC .............. 379/37–52, 90.01, 102.04; 340/539, 340/540, 506, 533, 10.2, 5.2
See application file for complete search history.

(56) References Cited

U.S. PATENT DOCUMENTS

| 4,465,904 | A | 8/1984 | Gottsegen et al. |
|---|---|---|---|
| 4,692,742 | A | 9/1987 | Raizen et al. |
| 4,918,717 | A | 4/1990 | Bissonnette et al. |
| 5,134,644 | A | 7/1992 | Garton et al. |
| 5,195,126 | A | 3/1993 | Carrier et al. |
| 5,365,568 | A | 11/1994 | Gilbert |
| 5,400,011 | A | 3/1995 | Sutton |
| 5,463,595 | A | 10/1995 | Rodhall |
| 5,568,475 | A | 10/1996 | Doshi et al. |
| 5,736,927 | A | 4/1998 | Stebbins et al. |
| 5,796,633 | A | 8/1998 | Burgess et al. |
| 5,808,547 | A | 9/1998 | Carney |
| 5,838,223 | A | 11/1998 | Gallant et al. |
| 5,877,684 | A | 3/1999 | Lu |
| 5,923,731 | A | 7/1999 | McClure |
| 5,940,474 | A | 8/1999 | Ruus |
| 6,075,451 | A | 6/2000 | Lebowitz et al. |
| 6,215,404 | B1 | 4/2001 | Morales |
| 6,243,373 | B1 | 6/2001 | Turock |
| 6,272,212 | B1 | 8/2001 | Wulforst et al. |
| 6,288,642 | B1 | 9/2001 | Dohrmann |

(Continued)

*Primary Examiner* — Maria El-Zoobi
(74) *Attorney, Agent, or Firm* — King & Spalding

(57) ABSTRACT

Delivery of alarm system event data and audio. In certain aspects, a method for delivery of alarm system event data is described, including communicating alarm event data from an alarm system to a private telecommunications switch. In turn, the alarm event data may be communicated to a message processing gateway. The message processing gateway evaluates service parameters of the alarm system and, in certain cases, instructs the private telecommunications switch to contact a central alarm monitoring station if certain service parameters are met. In additional aspects, private telecommunications switch opens a voice channel between the private telecommunications switch and the central alarm monitoring station and communicates the alarm event data. Additionally, in response to a determination that a voice channel between the private telecommunications switch and the central alarm monitoring station remains open, the private telecommunications switch may also bridge the voice channel to the alarm system.

24 Claims, 6 Drawing Sheets

(56) References Cited

U.S. PATENT DOCUMENTS

| | | |
|---|---|---|
| 6,311,072 B1 | 10/2001 | Barclay et al. |
| 6,369,705 B1 | 4/2002 | Kennedy |
| 6,381,307 B1 | 4/2002 | Jeffers et al. |
| 6,400,265 B1 | 6/2002 | Saylor et al. |
| 6,438,124 B1 | 8/2002 | Wilkes et al. |
| 6,452,490 B1 | 9/2002 | Garland et al. |
| 6,493,435 B1 | 12/2002 | Petricoin |
| 6,553,100 B1 | 4/2003 | Chen et al. |
| 6,574,480 B1 | 6/2003 | Foladare et al. |
| 6,577,234 B1 | 6/2003 | Dohrmann |
| 6,603,845 B2 | 8/2003 | Jensen et al. |
| 6,661,340 B1 | 12/2003 | Saylor et al. |
| 6,683,526 B2 | 1/2004 | Bellin |
| 6,829,478 B1 | 12/2004 | Layton et al. |
| 6,831,557 B1 | 12/2004 | Hess |
| 6,870,906 B2 | 3/2005 | Dawson |
| 6,928,148 B2 | 8/2005 | Simon et al. |
| 6,965,313 B1 | 11/2005 | Saylor et al. |
| 6,973,165 B2 | 12/2005 | Giacopelli et al. |
| 7,002,462 B2 | 2/2006 | Welch |
| 7,009,519 B2 | 3/2006 | Leonard et al. |
| 7,103,152 B2 | 9/2006 | Naidoo et al. |
| 7,113,090 B1 | 9/2006 | Saylor et al. |
| 7,119,609 B2 | 10/2006 | Naidoo et al. |
| 7,245,703 B2 | 7/2007 | Elliot et al. |
| 7,262,690 B2 | 8/2007 | Heaton et al. |
| 7,406,710 B1 | 7/2008 | Zellner et al. |
| 7,429,921 B2 | 9/2008 | Seeley et al. |
| 7,440,554 B2 | 10/2008 | Elliot et al. |
| 7,542,721 B1 | 6/2009 | Bonner et al. |
| 7,558,379 B2 | 7/2009 | Winick |
| 7,593,512 B2 | 9/2009 | Elliot et al. |
| 7,593,513 B2 | 9/2009 | Muller |
| 7,613,278 B2 | 11/2009 | Elliot et al. |
| 7,619,512 B2 | 11/2009 | Trundle |
| 7,633,385 B2 | 12/2009 | Cohn et al. |
| 7,653,186 B2 | 1/2010 | Hosain et al. |
| 7,734,020 B2 | 6/2010 | Elliot et al. |
| 7,751,540 B2 | 7/2010 | Whitfield et al. |
| 7,778,394 B2 | 8/2010 | Small et al. |
| 7,820,841 B2 | 10/2010 | Van Toor et al. |
| 7,848,505 B2 | 12/2010 | Martin et al. |
| 7,853,200 B2 * | 12/2010 | Blum et al. ............... 455/3.05 |
| 7,855,635 B2 | 12/2010 | Cohn et al. |
| 7,911,341 B2 | 3/2011 | Raji et al. |
| 7,920,841 B2 | 4/2011 | Martin et al. |
| 7,920,842 B2 | 4/2011 | Martin et al. |
| 7,920,843 B2 | 4/2011 | Martin et al. |
| 7,961,088 B2 | 6/2011 | Watts et al. |
| 8,022,807 B2 | 9/2011 | Martin et al. |
| 8,073,931 B2 | 12/2011 | Dawes et al. |
| 8,116,724 B2 | 2/2012 | Peabody |
| 8,214,494 B1 | 7/2012 | Slavin |
| 8,335,842 B2 | 12/2012 | Raji et al. |
| 8,350,694 B1 | 1/2013 | Trundle et al. |
| 8,456,293 B1 | 6/2013 | Trundle et al. |
| 8,473,619 B2 | 6/2013 | Baum et al. |
| 8,478,844 B2 | 7/2013 | Baum et al. |
| 8,493,202 B1 | 7/2013 | Trundle et al. |
| 8,520,072 B1 | 8/2013 | Slavin et al. |
| 8,525,665 B1 | 9/2013 | Trundle et al. |
| 2002/0103898 A1 | 8/2002 | Moyer et al. |
| 2002/0147982 A1 | 10/2002 | Naidoo et al. |
| 2002/0176581 A1 | 11/2002 | Bilgic et al. |
| 2002/0177428 A1 | 11/2002 | Menard et al. |
| 2003/0027547 A1 | 2/2003 | Wade |
| 2003/0071724 A1 | 4/2003 | D'Amico |
| 2004/0005044 A1 | 1/2004 | Yeh |
| 2004/0086088 A1 | 5/2004 | Naidoo |
| 2004/0086093 A1 | 5/2004 | Schranz |
| 2005/0099893 A1 | 5/2005 | Jyrinki |
| 2006/0023848 A1 | 2/2006 | Mohler et al. |
| 2006/0176167 A1 | 8/2006 | Dohrmann |
| 2007/0115930 A1 | 5/2007 | Reynolds et al. |
| 2007/0143838 A1 | 6/2007 | Milligan |
| 2007/0155412 A1 | 7/2007 | Kalsukis |
| 2008/0084291 A1 | 4/2008 | Campion, Jr. |
| 2008/0117029 A1 | 5/2008 | Dohrmann et al. |
| 2008/0191863 A1 | 8/2008 | Boling |
| 2008/0311879 A1 * | 12/2008 | Martin et al. ............... 455/404.1 |
| 2009/0017757 A1 | 1/2009 | Koga |
| 2009/0213999 A1 * | 8/2009 | Farrand et al. ............... 379/45 |
| 2009/0248967 A1 | 10/2009 | Sharma |
| 2009/0264155 A1 | 10/2009 | Nakayama et al. |
| 2009/0274104 A1 | 11/2009 | Addy |
| 2010/0007488 A1 | 1/2010 | Sharma et al. |
| 2010/0052890 A1 | 3/2010 | Trundle |
| 2010/0121948 A1 | 5/2010 | Procopio |
| 2010/0277271 A1 | 11/2010 | Elliot et al. |
| 2010/0289643 A1 | 11/2010 | Trundle |
| 2010/0289644 A1 | 11/2010 | Slavin |
| 2011/0065414 A1 * | 3/2011 | Frenette et al. ............ 455/404.1 |
| 2011/0169628 A1 | 7/2011 | Elliot et al. |
| 2011/0319071 A1 | 12/2011 | Beppler et al. |
| 2012/0027010 A1 | 2/2012 | Elliot et al. |
| 2012/0139718 A1 | 6/2012 | Foisy et al. |
| 2012/0250833 A1 | 10/2012 | Smith et al. |
| 2012/0250834 A1 | 10/2012 | Smith |
| 2012/0275588 A1 | 11/2012 | Gregory |
| 2013/0189946 A1 | 7/2013 | Swanson |
| 2013/0194091 A1 | 8/2013 | Trundle |
| 2013/0215266 A1 | 8/2013 | Trundle |
| 2013/0234840 A1 | 9/2013 | Trundle |

* cited by examiner

DELIVERY OF ALARM SYSTEM EVENT DATA AND AUDIO

CROSS-REFERENCE TO RELATED APPLICATION

This application claims the benefit of U.S. Provisional Application No. 61/471,569, filed Apr. 4, 2011, the entire contents of which is hereby incorporated herein by reference.

TECHNICAL FIELD

The present invention generally relates to a system and method for efficient delivery of alarm system event data and audio over telecommunications networks.

BACKGROUND

Historically, security alarm systems have relied upon the Public Switched Telephone Network (PSTN) to connect an alarm system to a central alarm monitoring station, so that alarm event data may be communicated from the alarm system to the central alarm monitoring station. These conventional alarm systems are configured to place an audio-band voice call to the central alarm monitoring station and transmit alarm event data to the central alarm monitoring station using (DTMF) touch tone codes, for example. Alarm systems equipped with two-way voice or ambient sound listening functionality have relied upon the same PSTN connection to connect a two-way audio-band voice call between the alarm system and the central alarm monitoring station. In this manner, an agent at the central alarm monitoring station is able to listen to ambient sounds captured by microphones at the premises where the alarm system is installed via the audio-band voice call. Similarly, the voice of the agent is communicated via the audio-band voice call and amplified by speakers and associated circuitry of the alarm system.

Some alarm systems substitute Voice over IP (VoIP) communications services for the PSTN. These systems also communicate both alarm event data and voice over a two-way audio-band voice channel established using the VoIP service. It is noted that, for VoIP-equipped alarm systems, additional flexibility in the manner by which the alarm systems connect to central monitoring stations would be desirable. For example, while conventional alarm systems are configured to establish and maintain a voice channel upon the occurrence of an alarm event, the establishment of the voice channel is not evaluated by any means. In this context, it would be desirable to achieve additional flexibility for alarm system monitoring service providers, so that the establishment of the voice channel may be based, in part, upon considerations evaluated by the providers and system maintained by the providers. Additionally, it would be desirable to leverage the benefits of using VoIP communications in place of the PSTN. For example, it would be desirable to leverage the speed and flexibility offered by using VoIP communications.

The present invention is directed to addressing the deficiencies of and achieving improvements over the above-discussed conventional systems by efficiently and flexibly delivering alarm system event data and audio.

SUMMARY OF THE INVENTION

In one embodiment, a method for delivery of alarm system event data and audio is described, including detecting, by an alarm system, an alarm event, communicating, by the alarm system, alarm event data to a private telecommunications switch, the alarm event data being representative of the alarm event, communicating, by the private telecommunications switch, the alarm event data to a message processing gateway, evaluating, by the message processing gateway, service parameters of the alarm system, instructing, by the message processing gateway, the private telecommunications switch to contact a central alarm monitoring station if certain service parameters of the alarm system are met, in response to the instructions to contact the central alarm monitoring station, opening, by the private telecommunications switch, a Public Switched Telephone Network (PSTN) voice channel between the private telecommunications switch and the central alarm monitoring station and communicating the alarm event data to the central alarm monitoring station, determining, by the private telecommunications switch, whether the PSTN voice channel between the private telecommunications switch and the central alarm monitoring station remains open after communication of the alarm event data to the central alarm monitoring station, and, in response to determining that the PSTN voice channel between the private telecommunications switch and the central alarm monitoring station remains open, bridging, by the private telecommunications switch, the PSTN voice channel between the private telecommunications switch and the central alarm monitoring station to the alarm system, to create a voice channel between the alarm system and the central alarm monitoring station.

In one aspect, the method further includes initiating, by the alarm system, a call to the central alarm monitoring station using an telephone adapter in response to the alarm event, and connecting, by the telephone adapter, to the private telecommunications switch and opening a voice channel between the alarm system and the private telecommunications switch based on the call initiated by the alarm system, wherein bridging the voice channel to the alarm system includes bridging, by the private telecommunications switch, the voice channel between the alarm system and the private telecommunications switch with the PSTN voice channel between the private telecommunications switch and the central alarm monitoring station, to create the voice channel between the alarm system and the central alarm monitoring station. In other aspects, initiating the call to the central alarm monitoring station by the alarm system includes initiating the call to the central alarm monitoring station according to a telephone number of the central alarm monitoring station, and communicating the alarm event data to the message processing gateway by the private telecommunications switch further includes communicating an identifier of the telephone adapter and the telephone number to the message processing gateway.

In another aspect, evaluating service parameters of the alarm system includes at least one of determining whether the alarm system or the telephone adapter is provisioned at the message processing gateway, determining whether the alarm system is associated with an active customer account, and determining whether the alarm system is capable and configured for a two-way voice channel. In other aspects, the method further includes communicating, by the message processing gateway, the alarm event data to the central alarm monitoring system if the certain service parameters of the alarm system are not met. Additionally, the method may further include, in response to determining that the PSTN voice channel between the private telecommunications switch and the central alarm monitoring station has not remained open, indicating to the alarm system, by the private telecommunications switch to the alarm system, that the central alarm monitoring station has disconnected. Further, the method may include modifying, by the message processing gateway, data received from the private telecommunications switch, before instructing the private telecommunications switch to contact the central alarm monitoring station. Still further, the method may include communicating, by the message processing gateway, the modified data to the private telecommunications switch, before instructing the private telecommunications switch to contact the central alarm monitoring station.

In another embodiment, a system for delivery of alarm system event data and connecting a voice channel is described, including an alarm system configured to detect an alarm event, and communicate alarm event data representative of the alarm event, a message processing gateway configured to receive the alarm event data from the alarm system, evaluate service parameters of the alarm system, and send instructions to contact a central alarm monitoring station if certain service parameters of the alarm system are met, and a private telecommunications switch configured to open a Public Switched Telephone Network (PSTN) voice channel between the private telecommunications switch and the central alarm monitoring station and communicate the alarm event data to the central alarm monitoring station, in response to the instructions to contact the central alarm monitoring station, determine whether the PSTN voice channel between the private telecommunications switch and the central alarm monitoring station remains open after communication of the alarm event data to the central alarm monitoring station, and bridge the PSTN voice channel between the private telecommunications switch and the central alarm monitoring station to the alarm system, to create a voice channel between the alarm system and the central alarm monitoring station, in response to a determination that the PSTN voice channel between the private telecommunications switch and the central alarm monitoring station remains open.

In one aspect of the system for delivery of alarm system event data, the alarm system is further configured to initiate a call to the central alarm monitoring station using an telephone adapter in response to the alarm event, and connect to the private telecommunications switch and open a voice channel between the alarm system and the private telecommunications switch using the telephone adapter based on the call initiated by the alarm system, and the private telecommunications switch is further configured to bridge the voice channel between the alarm system and the private telecommunications switch with the PSTN voice channel between the private telecommunications switch and the central alarm monitoring station, to create the voice channel between the alarm system and the central alarm monitoring station. In other aspects of the system for delivery of alarm system event data, the alarm system is further configured to initiate the call to the central alarm monitoring station according to a telephone number of the central alarm monitoring station, and the private telecommunications switch is further configured to receive the alarm event data from the alarm system, and communicate the alarm event data and an identifier of the telephone adapter to the message processing gateway.

In another aspect of the system for delivery of alarm system event data, the message processing gateway is further configured to determine whether the alarm system or the telephone adapter is provisioned, determine whether the alarm system is associated with an active customer account, and determine whether the alarm system is capable and configured for a two-way voice channel. Additionally, the message processing gateway may be further configured to communicate the alarm event data to the central alarm monitoring system if the certain service parameters of the alarm system are not met. In other aspects of the system for delivery of alarm system event data, the private telecommunications switch is further configured to indicate to the alarm system that the central alarm monitoring station has disconnected, in response to a determination that the PSTN voice channel between the private telecommunications switch and the central alarm monitoring station has not remained open. Further, the message processing gateway may be further configured to modify data received from the private telecommunications switch, before sending the instructions to contact the central alarm monitoring station. Still further, the message processing gateway may be further configured to communicate the modified data to the private telecommunications switch, before sending the instructions to contact the central alarm monitoring station.

In another embodiment, an apparatus for delivery of alarm system event data and connecting a voice channel is described, including a message processing gateway configured to receive alarm event data from an alarm system, evaluate service parameters of the alarm system, and send instructions to contact a central alarm monitoring station if certain service parameters of the alarm system are met, and a private telecommunications switch configured to open a Public Switched Telephone Network (PSTN) voice channel between the private telecommunications switch and the central alarm monitoring station and communicate the alarm event data to the central alarm monitoring station, in response to the instructions to contact the central alarm monitoring station, determine whether the PSTN voice channel between the private telecommunications switch and the central alarm monitoring station remains open after communication of the alarm event data to the central alarm monitoring station, and bridge the PSTN voice channel between the private telecommunications switch and the central alarm monitoring station to the alarm system, to create a voice channel between the alarm system and the central alarm monitoring station, in response to a determination that the PSTN voice channel between the private telecommunications switch and the central alarm monitoring station remains open.

In one aspect of the apparatus for delivery of alarm system event data and connecting a voice channel, the private telecommunications switch is further configured to open a voice channel between the alarm system and the private telecommunications switch using a telephone adapter, and bridge the voice channel between the alarm system and the private telecommunications switch with the PSTN voice channel between the private telecommunications switch and the central alarm monitoring station, to create the voice channel between the alarm system and the central alarm monitoring station. In other aspects of the apparatus for delivery of alarm system event data and connecting a voice channel, the private telecommunications switch is further configured to receive the alarm event data from the alarm system, and communicate the alarm event data and an identifier of the telephone adapter to the message processing gateway.

In another aspect of the apparatus for delivery of alarm system event data and connecting a voice channel, the message processing gateway is further configured to determine whether the alarm system or the telephone adapter is provisioned, determine whether the alarm system is associated with an active customer account, and determine whether the alarm system is capable and configured for a two-way voice channel. Additionally, the message processing gateway may be further configured to communicate the alarm event data to the central alarm monitoring system if the certain service parameters of the alarm system are not met. Further, the private telecommunications switch may be further configured to indicate to the alarm system that the central alarm monitoring station has disconnected, in response to a determination that the PSTN voice channel between the private telecommunications switch and the central alarm monitoring station has not remained open. In other aspects of the apparatus for delivery of alarm system event data and connecting a voice channel, the message processing gateway is further configured to modify data received from the private telecommunications switch, before sending the instructions to contact the central alarm monitoring station. Further, the message processing gateway may be further configured to communicate the modified data to the private telecommunications switch, before sending the instructions to contact the central alarm monitoring station.

In still another embodiment, a method for delivery of alarm system event data and audio is described, including communicating, by an alarm system, alarm event data to a private telecommunications switch, communicating, by the private telecommunications switch, the alarm event data to a message processing gateway, instructing, by the message processing gateway, the private telecommunications switch to contact a central alarm monitoring station if certain service parameters of the alarm system are met, in response to the instructions to contact the central alarm monitoring station, opening, by the private telecommunications switch, a voice channel between the private telecommunications switch and the central alarm monitoring station and communicating the alarm event data to the central alarm monitoring station, determining, by the private telecommunications switch, whether the voice channel between the private telecommunications switch and the central alarm monitoring station remains open after communication of the alarm event data to the central alarm monitoring station, and in response to determining that the voice channel between the private telecommunications switch and the central alarm monitoring station remains open, bridging, by the private telecommunications switch, the voice channel between the private telecommunications switch and the central alarm monitoring station to the alarm system.

In one aspect, the method further includes initiating, by the alarm system, a call to the central alarm monitoring station using an telephone adapter in response to an alarm event, and connecting, by the telephone adapter, to the private telecommunications switch and opening a voice channel between the alarm system and the private telecommunications switch based on the call initiated by the alarm system, wherein bridging the voice channel to the alarm system includes bridging, by the private telecommunications switch, the voice channel between the alarm system and the private telecommunications switch with the voice channel between the private telecommunications switch and the central alarm monitoring station, to create the voice channel between the alarm system and the central alarm monitoring station. In other aspects, initiating the call to the central alarm monitoring station by the alarm system includes initiating the call to the central alarm monitoring station according to a telephone number of the central alarm monitoring station, and communicating the alarm event data to the message processing gateway by the private telecommunications switch further includes communicating an identifier of the telephone adapter and the telephone number to the message processing gateway. Further, evaluating service parameters of the alarm system may include at least one of determining whether the alarm system or the telephone adapter is provisioned at the message processing gateway, determining whether the alarm system is associated with an active customer account, and determining whether the alarm system is capable and configured for a two-way voice channel.

BRIEF DESCRIPTION OF THE DRAWINGS

For a more complete understanding of the invention and the advantages thereof, reference is now made to the following description, in conjunction with the accompanying figures briefly described as follows.

The figures illustrate only exemplary embodiments and are therefore not to be considered limiting of scope, as other equally effective embodiments are within the scope and spirit of this disclosure.

DETAILED DESCRIPTION

In the following paragraphs, the present invention will be described in further detail by way of example with reference to the attached drawings. In the description, well known components, methods, and/or processing techniques are omitted or briefly described so as not to obscure the invention. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention may be implemented by a computer program executed by one or more processors, as described and illustrated. As would be apparent to one having ordinary skill in the art, the present invention may be implemented, at least in part, by computer-readable instructions in various forms, and the present invention is not intended to be limited to a particular set or sequence of instructions executed by the processor.

Turning now to the drawings, in which like numerals indicate like, but not necessarily the same, elements throughout, exemplary embodiments of the invention are described in detail.

Figure 1:
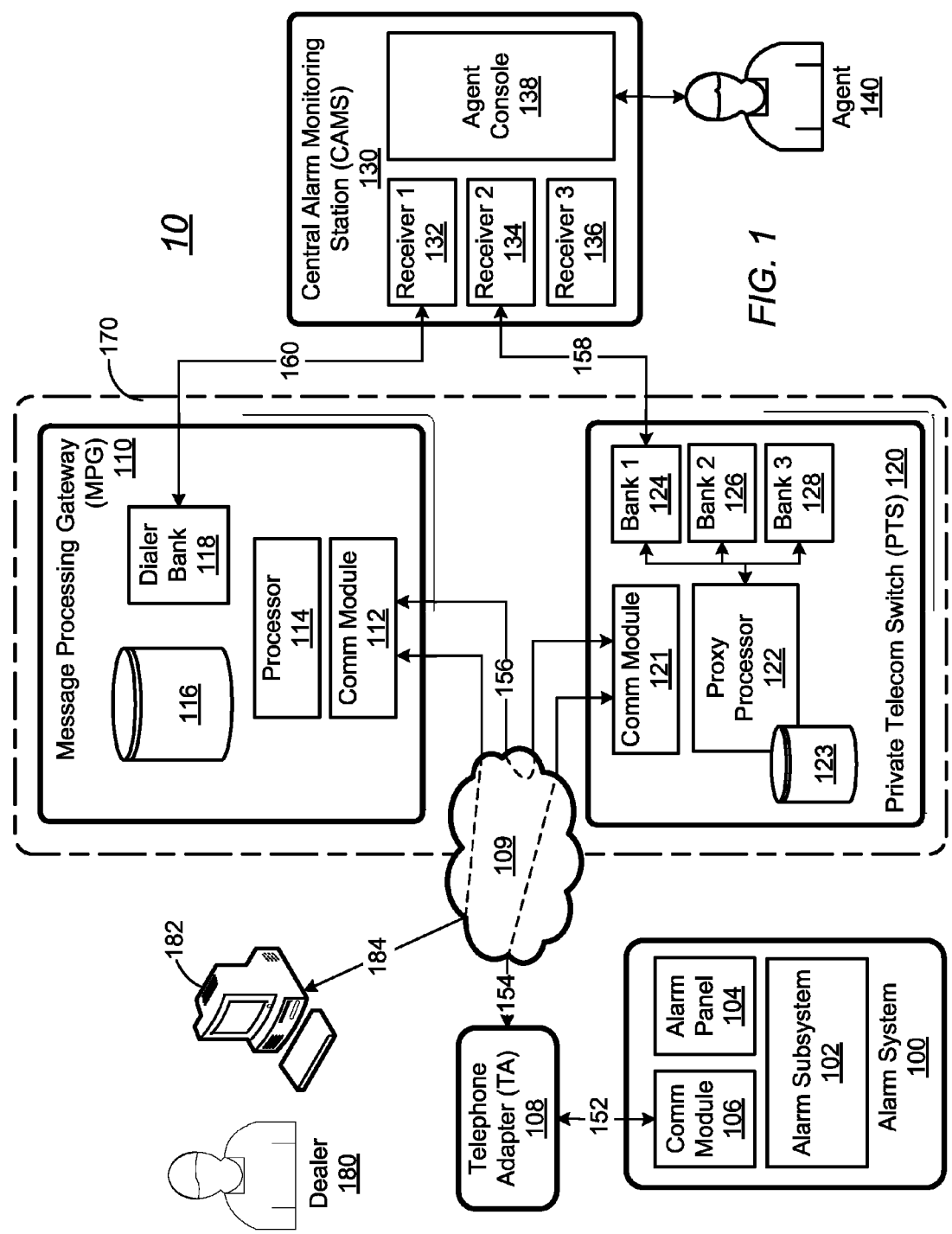
FIG. 1 illustrates a system for delivery of alarm system event data and audio.

FIG. 1 illustrates an exemplary system 10 for efficient delivery of alarm system event data and audio. As illustrated, the system 10 includes an alarm system 100, a Telephone Adapter (TA) 108, a Message Processing Gateway (MPG) 110, a Private Telecommunications Switch (PTS) 120, and a Central Alarm Monitoring Station (CAMS) 130. The elements of the system 10 are communicatively coupled by various communications links and networks such as data network 109. In certain aspects, the system 10 includes interfaces for users of the system. Examples of users of the system 10 include alarm services dealer 180 and agent 140. Examples of the interfaces for the users include the dealer computing device 182 and the agent console 138, which are described in further detail below.

The alarm system 100 comprises an alarm subsystem 102, an alarm panel 104, and a communications module 106. The alarm subsystem 102 includes one or more sensors for detecting various types of alarm events, such as fire, burglary, or medical emergency. As a non-limiting example subset of sensors for detecting fires and burglaries, the alarm subsystem 102 may include wired and/or wireless magnetic window and door sensors, glass-break sensors, infra-red sensors, motion sensors, smoke detectors, and carbon monoxide sensors. The alarm subsystem 102 may further comprise one or more sirens, speakers, and microphones for sounding an alarm, capturing sounds within a premises at which the alarm system 100 is installed, and amplifying a voice of an agent as described in further detail below. The alarm panel 104 comprises a display illustrating a current status of the alarm system 100 and a keypad including buttons and/or other controls to configure the alarm system 100, for example. A user of the alarm system 100 is able to determine a current status of the alarm system 100 by viewing the display of the alarm panel 104. The user is also able to call for fire, police, and medical emergency personnel using the keypad of the alarm panel 104. The alarm system 100 further comprises other wiring and associated circuitry necessary for alarm systems as understood in the art. The alarm system 100 may be installed at any location including a home or office building.

The communications module 106 comprises circuitry and associated firmware and/or software for establishing data and voice channels with other communications modules. Particularly, the communications module 106 is configured to establish data and voice channels using industry standard communications protocols and communications links. As used herein, a "voice channel" includes a channel having bandwidth sufficient to carry the frequencies of a human voice, typically about 3 KHz. A standard voice call established over the PSTN comprises one example of a "voice channel." In various embodiments, the communications module 106 comprises circuitry and associated firmware and/or software layers to communicate over wired networks such as twisted pair telephone line PSTN networks, for example. The communications module 106 may be further configured to communicate data using various signaling techniques and protocols such as Dual-Tone Multi-frequency ("DTMF") signaling, for example.

In operational aspects, the alarm system 100 is configured to detect an alarm event using one or more of the sensors of the alarm subsystem 102 or the alarm panel 104, and communicate associated alarm event data to the MPG 110 using a data channel established between the alarm system 100 and the MPG 110. In one embodiment, the alarm system 100 may communicate alarm event data in the alarm industry standard Contact ID format. Accordingly, the alarm system 100 may communicate the Contact ID event codes "100," "120," or "130" for fire, panic, and burglary alarms, respectively, as understood in the art. According to additional aspects, the alarm system 100 is also configured to initiate a call to the CAMS 130 using the TA 108 in response to the alarm event and open a voice channel between the alarm system 100 and the CAMS 130 in response to the alarm event, as described in further detail below. It is noted that the alarm system 100 is configured to store a telephone number of one or more central alarm monitoring stations, such as the CAMS 130, to call when an alarm event is detected.

The TA 108 comprises circuitry and associated firmware and/or software for interfacing a standard analog voice-band telephone with a VoIP network. In certain embodiments, the TA 108 includes, at least, a first packet-based data port, such as an RJ45 Ethernet port, and a second voice-band telephone port, such as an RJ11 telephone port, for example. The RJ11 telephone port provides a port for communicatively coupling the TA 108 and the alarm system 100 via communications link 152, which may comprise a twisted pair of wires generally used for voice-band telephone networks. The RJ45 telephone port provides a port for communicatively coupling the TA 108 to the data network 109 via communications link 154, for example. In other embodiments, the TA 108 may include other standard and/or non-standard connectors, ports, and couplings for communicatively coupling to the alarm system 100 and the data network 109. In embodiments where the TA 108 is installed within a home or office building along with the alarm system 100, the TA 108 may be connected to the data network 109 via one or more intermediate network modems, routers, and switches, as would be understood in the art. In general, the data network 109 comprises a packet-based private, public, or combination of private and public networks including, for example, the Internet. It is additionally noted that the data network 109 may include combinations of both wired and wireless portions. Among other aspects, the telephone adapter is configured to open a voice channel between the alarm system 100 and the PTS 120 based on a call initiated by the alarm system 100.

The MPG 110 includes, but is not limited to, a communications module 112, a processor 114, a database 116, and a dialer bank 118. The communications module 112 is configured to communicate with other elements of the system 10, such as the PTS 120, for example, via the communications link 156 over the data network 109. In various embodiments, the communications link 156 may traverse the data network 109, but other connections are within the scope of this disclosure. For example, the communications link 156 may be a direct wired connection or completely contained within a private packet-based data network. The processor 114 comprises a general purpose processor that directs and coordinates the functions of the MPG 110, as described herein. As such, the processor 114 may direct and coordinate the actions and processes of the communications module 112 and the dialer bank 118, among other components of the MPG 110, for example. In certain embodiments, the processor 114 may execute program instructions stored on the database 116 or other memory devices, directing the processor 114 to perform certain processes, as described in further detail below.

In one embodiment, the dialer bank 118 is configured to establish a voice channel to the CAMS 130 via the communications link 160, which may comprise one or more wired or wireless communications links. The dialer bank 118 may be further configured to communicate data, including alarm event data received from the alarm system 100, to the CAMS station 130 using DTMF signaling via the communications link 160. In one embodiment, the communications link 160 comprises the PSTN. In another embodiment, the communications link 160 comprises a packet-based data network similar to the data network 109.

The database 116 comprises one or more computer-readable storage devices that store computer-executable program code as well as data related to alarm systems, telephone adapters, accounts of alarm monitoring subscribers, alarm system event data, and other associated data. For example, the database 116 may store data associated with a plurality of alarm monitoring subscriber accounts for billing and other purposes. Further, the database 116 may store data associated with the hardware and software configurations of the alarm system 100 and the TA 108, including manufacturer serial numbers, pseudo serial numbers, makes, models, Media Access Control (MAC) addresses or identifiers, account numbers, installation addresses, and service records, for example. "Pseudo serial numbers" are described in further detail below. In certain embodiments, the database 116 may additionally store data associated with the communications protocols and methods of the alarm system 100 and the TA 108, such as a Session Initiation Protocol (SIP) username and password of the TA 108, for example. The account data and other associated information stored in the database 116 may be maintained and updated by account owners such as alarm services dealers. Also, the MPG 110 may communicate the information stored in the database 116, in certain parts and aspects, to the PTS 120, and the PTS 120 may communicate information to the MPG 110 to be stored in the database 116. It is noted that the MPG 110 provides and facilitates alarm monitoring services for a plurality of alarm systems in addition to the alarm system 100. In other words, the system 10, in various embodiments, may include a plurality of alarm systems similar, but not necessarily the same as, the alarm system 100. Similarly, the system 10 may include a plurality of TAs similar, but not necessarily the same as the TA 108, corresponding to each of the plurality of alarm systems in addition to the alarm system 100. As such, the database 116 stores data related to a plurality of alarm systems and TAs in addition to the alarm system 100 and the TA 108.

In operational aspects, the MPG 110 is configured to receive alarm event data from the alarm system 100, evaluate service parameters of the alarm system 100 and the alarm event data, and send instructions to contact the CAMS 130 if certain service parameters of the alarm system 100 are met. Additionally, the MPG 110 is further configured to communicate alarm event data to the CAMS 130 if the certain service parameters of the alarm system and the alarm event data are not met. In other aspects, the MPG 110 is configured to determine whether the alarm system 100 and/or the TA 108 is provisioned at the MPG 110, determine whether the alarm system 100 is associated with an active customer account, and determine whether the alarm system 100 is capable and configured for a two-way voice channel. A more detailed description of the operational aspects of the MPG 110 is discussed below.

In certain aspects, alarm services dealers such as dealer 180 may access the MPG 110 using the communications module 112 via a communication link 184 to establish new and update existing alarm monitoring services. When accessing the MPG 110 using the dealer computing device 182, the dealer 180 is able to register new customers, provide account information for the new customers, set service parameters for new customers, and update registration, account, and service information and parameters for existing customers, for example. Further, the dealer 180 is able to provide information to the MPG 110 regarding provisioning new alarm systems and TAs for use with the system 10. In that context, it is noted that, when an alarm system is being updated or provisioned for monitoring service, the dealer 180 may connect to the MPG 110 using the dealer computing device 182 to establish the service parameters for the new installation. For example, the dealer 180 may provide specifics regarding the alarm system 100 and the TA 108 to the MPG 110. The specifics may include one or more of unique pseudo serial numbers, manufacturer serial numbers, and/or Media Access Control addresses of the alarm system 100 and/or the TA 108, among other information.

In one embodiment, at least the pseudo serial number of the TA 108 is provided by the dealer 180 to the MPG 110 when establishing new or updating existing alarm monitoring services using the TA 108. The pseudo serial number of the TA 108 may be uniquely predetermined by the MPG 110, the PTS 120, or a combination of the MPG 110 and the PTS 120 for the TA 108 and maintained with the TA 108 for reference. That is, the predetermined pseudo serial number of the TA 108 may be unique to the TA 108 among TAs and printed or affixed on the TA 108 in various forms, for quick reference by the dealer 180 when contacting the MPG 110 to provision service using the TA 108. As one non-limiting example for context, the pseudo serial number may comprise a number similar in nature to a manufacturer's serial number, but starting with the letter "B". The pseudo serial number of any given TA may be determined by the MPG 110, the PTS 120, or a combination of the MPG 110 and the PTS 120 based on one or more of the manufacturer's serial number, make, or model of the TA, and may be associated with a Session Initiation Protocol (SIP) username and password of the TA. In certain aspects, the MPG 110, the PTS 120, or a combination of the MPG 110 and the PTS 120 may predetermine pseudo serial numbers for a plurality of TAs available to the dealer 180 for use in alarm system installations. In another embodiment, one or more of the manufacturer serial number, MAC address, make, and model of the TA 108 is provided by the dealer 180 to the MPG 110 when establishing new or updating existing alarm monitoring services using the TA 108. In this case, a pseudo serial numbers for the TA 108 may be generated at the time the TA 108 is provisioned for new active service.

Besides providing the specifics of the hardware to be monitored, the dealer 180 is also able to establish or update a type of alarm monitoring service for each customer serviced using the MPG 110. For example, a new alarm monitoring service may or may not include voice monitoring in addition to data (i.e., event code) monitoring. Such monitoring parameters may be set by the dealer 180 by accessing the MPG 110 using the dealer computing device 182.

After receiving the specifics, MPG 110 may provision the alarm system 100 and the TA 108 for active alarm monitoring in connection with the PTS 120. In certain aspects, provisioning may include communicating certain information received by the MPG 110 from the dealer 180 to the PTS 120 and generating, among the MPG 110 and the PTS 120 (if not already determined beforehand), a pseudo serial number for the alarm system 100, the TA 108, and/or a combination of the alarm system 100 and the TA 108. After the MPG 110 is satisfied with all information required for provisioning the alarm system 100 and the TA 108 for active alarm monitoring service, the MPG 110 may communicate a message to the PTS 120 indicating that, at least, the TA 108 is provisioned for active alarm monitoring service. In some embodiments, MPG 110 may communicate a message to the PTS 120 indicating that the TA 108 and the alarm system 100 are both provisioned for active alarm monitoring service.

The PTS 120 comprises a communications module 121, one or more proxy processors 122, a database 123, and at least one bank of communications modules. Particularly, the PTS 120, as illustrated, includes three communications banks 124, 126, and 128. The communications module 121 is similar to the communications module 112 and facilitates communication over data networks such as the data network 109. The PTS 120 may comprise additional or fewer communications banks among embodiments. In one embodiment, the MPG 110 and the PTS 120 comprise separate computing devices, and the PTS 120 is communicatively coupled to the MPG 110 via the communications link 156. The PTS 120 and the MPG 110 may communicate using Application Programming Interface ("API") web services via the communications link 156 using the communications modules 112 and 121. In other embodiments, the PTS 120 and the MPG 110 may be integrated as a single computing device, as designated by the hashed outline 170. The database 123 comprises one or more computer-readable storage devices that store computer-executable program code as well as data related to alarm systems, telephone adapters, accounts of alarm monitoring subscribers, alarm system event data, and other associated data. In certain aspects, at least in part, the database 123 stores data similar to the data stored by the database 116.

The communications banks 124, 126, and 128 are configured to establish a voice channel to the CAMS 130 via the communications link 158, which may comprise the PSTN or one or more wired or wireless communications links including the PSTN. It is noted that, in certain embodiments, the communications link 158 may comprise communications links other than the PSTN, including communications links that traverse the data network 109. As compared to the dialer bank 118, the communications banks 124, 126, and 128 may comprise additional circuitry, firmware, and/or software. That is, the dialer bank 118 may comprise circuitry for establishing a voice channel between the MPG 110 and the CAMS 130 and communicating data using DTMF tones to the CAMS 130 via the communications link 160, but not circuitry for facilitating a two-way audio-band voice conversation between individuals via the communications link 160. Thus, as compared to the dialer bank 118, the communications banks 124, 126, and 128 may comprise additional circuitry, firmware, and/or software to facilitate two-way voice communications over the voice channel established between the PTS 120 and the CAMS 130 via the communications link 158.

In operational aspects, the PTS 120 is configured to open a voice channel to the CAMS 130 and communicate alarm event data and associated information received from the alarm system 100, as may be modified in certain cases by the MPG 100, to the CAMS 130. In additional aspects, the PTS 120 is further configured to determine whether the voice channel between the PTS 120 and the CAMS 130 remains open after data, such as the alarm event data, is communicated to the CAMS 130. The PTS 120 is further configured to bridge a voice channel between the alarm system 100 and the CAMS 130, as described in further detail below.

The CAMS 130 comprises at least one agent console 138 and a plurality of receiver modules 132, 134, and 136. The central alarm monitoring station is staffed by personnel including agent 140. As illustrated in FIG. 1, the agent 140 is able to view the agent console 138, which displays information associated with received alarm event data from alarm systems. For example, after receiving alarm event data and associated information from the alarm system 100, the agent console 138 may display details related to an alarm event occurring at a location where the alarm system 100 is installed. For example, based on alarm event data received from the alarm system 100, the agent console 138 may indicate that a fire, panic, burglary, or medical emergency is occurring at a home or office where the alarm system 100 is installed. Additionally, the agent console 138 may display a street address or geographic coordinates of the home or office with contact information for fire, police, and medical services. Based on the display, the agent 140 is able to assess the event where the alarm system 100 is installed. Generally, the CAMS 130 facilitates monitoring alarm systems installed at a plurality of locations by one or more agents that assess alarm events and, sometimes, contact service personnel based upon alarm event data received from the alarm systems. For example, the agents monitoring alarm systems at the CAMS 130 may call for fire, police, or medical service personnel to be dispatched based on alarm event data received from a plurality of monitored alarm systems.

When an alarm system includes two-way voice functionality, a voice channel may be established between the alarm system 100 and the CAMS 130. As such, the agent 140 at the CAMS 130 is able to listen to ambient sounds captured by microphones of an alarm system, for example, at a location where the alarm system is installed. The sounds may be communicated over a voice channel established between the alarm system 100 and the CAMS 130. The agent is also able to speak into a handset or headset microphone, for example, at the CAMS 130, and the agent's voice may be communicated over the voice channel and amplified over speakers at the location where the alarm system is installed. As described herein, an alarm system comprising "two-way voice functionality" is capable of establishing a full-duplex voice-band audio link between the alarm system and an alarm monitoring station. Using the two-way voice functionality, the agent 140 is able to assess any ambient sounds captured at a location where an alarm system is installed in connection with received alarm event data. For example, the agent 140 may be able to hear one or more persons committing a crime in connection with alarm event data indicating a burglary event and warn those persons that police have been dispatched. In another example, the agent may be able to hear an individual's request for medical assistance.

Turning again to aspects of the TA 108, it is noted that the TA 108 stores an address of the PTS 120, to connect to the PTS 120 over the data network 109. For example, the TA 108 may store a static Internet Protocol (IP) or Uniform Resource Locator (URL) address of the PTS 120. The stored address of the PTS 120 may be pre-configured for the TA 108 by a manufacturer of the TA 108, for example, at the request of the dealer 180, for example, when purchasing the TA 108 for use in new alarm system installations. Alternatively or additionally, the TA 108 may be configured or re-configured with the stored address of the PTS 120 by the dealer 180 before being provided to a new alarm monitoring service customer. In operational aspects, when the alarm system 100 detects an alarm event, the communications module 106 of the TA 108 opens a connection to the TA 108 via the communications link 152. Because, in certain embodiments, the communications module 106 of the alarm system 100 is configured to communicate over wired networks such as twisted pair telephone line PSTN networks, the communications module 108 may expect to receive a telephone dial tone upon opening a connection to the TA 108. The TA 108 is configured to generate a dial tone upon opening a connection via the communications link 152. Upon receiving the dial tone, the communications module 108 dials a telephone number of the CAMS 130 and waits for a connection to be opened. While waiting for the connection to the opened, the communications module 108 may receive "rings" from the TA 108, as would be common when placing a standard telephone call over PSTN networks.

It is noted that, as compared to conventional alarm systems, the system 10 is configured to permit the alarm system 100 to quickly open a communications link and provide alarm event data in response to the detection of an alarm event. It is noted that, in certain conventional alarm systems, the alarm system 100 establishes a communications link directly to the CAMS 130 by placing a telephone call to the CAMS 130 via the PSTN. In that context, depending upon the status of the CAMS 130, the CAMS 130 may or may not accept the telephone call quickly. For example, the alarm system 100 may have to wait for several "rings" before the CAMS 130 answers a telephone call.

As discussed above, the alarm system 100 stores the telephone number of the CAMS 130 and places a call to the CAMS 130 when an alarm event is detected. However, according to the configuration of the system 10 of FIG. 1, when the alarm system 100 dials the telephone number of the CAMS 130 using the TA 108, the TA 108 connects to the PTS 120 and the PTS 120 and the TA 108 open or negotiate a voice channel among themselves on the communications link 152. In this context, it is noted that the PTS 120 is an intermediary between the alarm system 100 and the CAMS 130. Similarly, the MPG 110 is an intermediary between the alarm system 100 and the CAMS 130. In concert with the MPG 110, the PTS 120 adds additional flexibility in the system 10 as compared to conventional alarm systems. For example, if the alarm system 100 were to establish a communications link directly to the CAMS 130, the alarm system monitoring service provider of the alarm system 100 may be limited in opportunities to intervene, monitor, or modify the communications between the alarm system 100 and the CAMS 130. For example, in certain conventional alarm systems, if a customer were to change or update alarm monitoring service plans, fail to maintain current account balances, or cancel service, the service provider may be required to connect to the alarm system 100 via a communications link and update parameters of the alarm system 100 or make a service call to the location whether the alarm system 100 is installed. Based on the configuration of the system 10, the service provider has additional options to intervene, monitor, or modify the communications between the alarm system 100 and the CAMS 130, as may be needed from time to time under various circumstances. Additionally, due to the speed of the communications and processing between and among the MPG 110 and the PTS 120, the MPG 110 and the PTS 120, although intermediary between the alarm system 100 and the CAMS 130, may appear generally transparent for purposes of communicating alarm event data from the alarm system 100 to the CAMS 130.

It is noted that, even before the TA 108 connects to the PTS 120 to open a voice channel between the alarm system 100 and the PTS 120 in response to a call dialed to the CAMS 130 by the alarm system 100, the PTS 120 is aware that the TA 108 is connected to the network 109. Particularly, when the TA 108 is powered on, the TA 108 is configured to contact the PTS 120 via the data network 109 to establish that it is available and active. In turn, the PTS 120 may periodically "ping" the TA 108 to determine whether the TA 108 is still available and active, for service integrity monitoring and logging. The PTS 120 may also communicate records to the MPG 130 indicating when the TA 108 is available and active on the data network 109, for monitoring and logging. Further, the PTS 120 may also communicate call detail records to the MPG 130, detailing any inbound and outbound calls made and the respective timings and durations of those calls, for monitoring and logging.

Before turning to the process flow diagrams of FIGS. 2-5, it is noted that the present invention may be practiced using an alternative order of the steps illustrated in FIGS. 2-5. That is, the process flows illustrated in FIGS. 2-5 are provided as examples only, and the present invention may be practiced using process flows that differ from those illustrated. Additionally, it is noted that not all steps are required in every embodiment. In other words, one or more of the steps may be omitted or replaced, without departing from the spirit and scope of the invention. In alternative embodiments, steps may be performed in different orders, in parallel with one another, or omitted entirely, and/or certain additional steps may be performed without departing from the scope and spirit of the invention.

Figure 2:
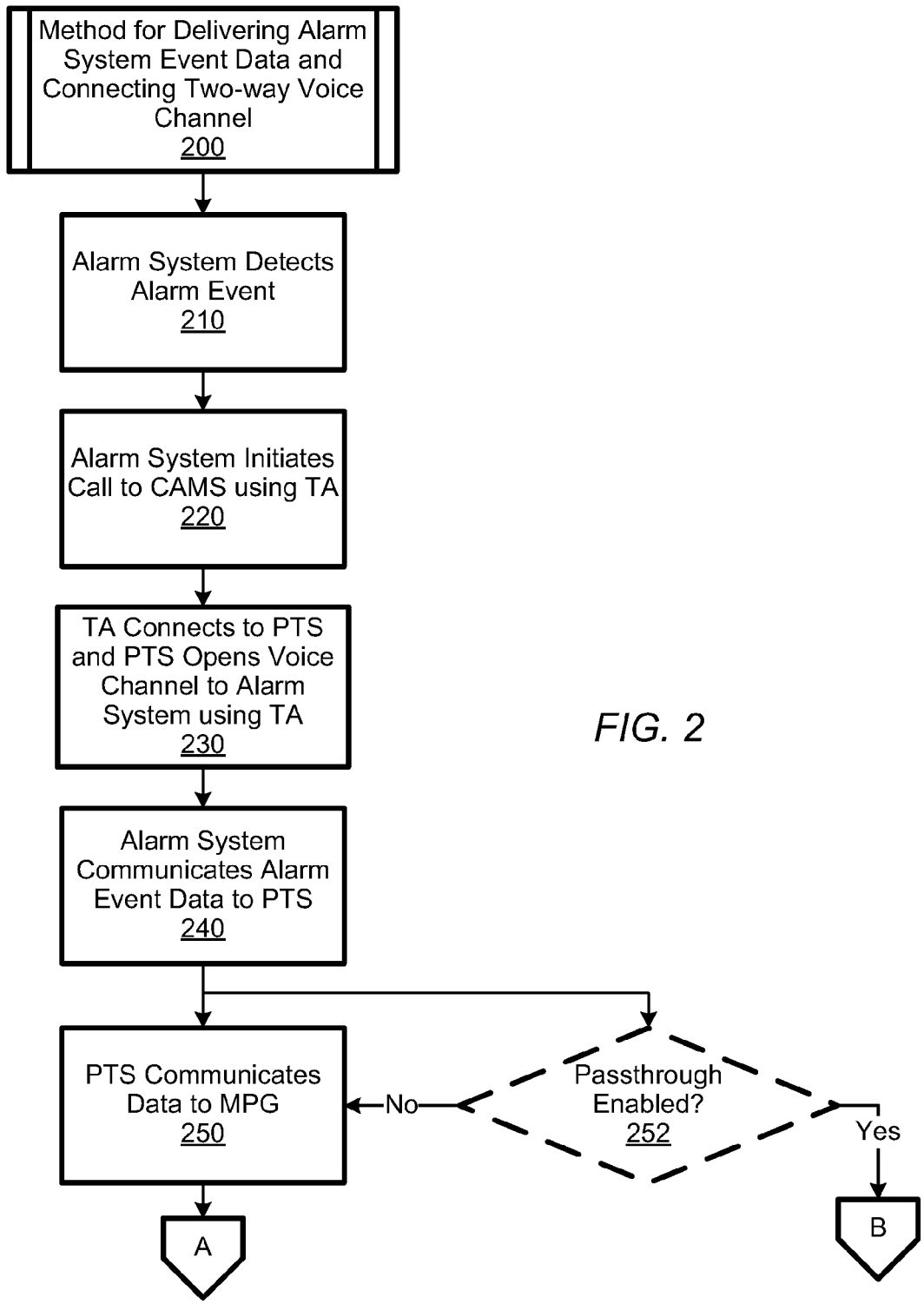
FIG. 2 illustrates a process flow diagram of a method for delivering alarm system event data and connecting a two-way voice channel.

Turning to FIG. 2, a method 200 for delivering alarm system event data and connecting a two-way voice channel is illustrated. The method 200 is generally described in terms of the elements of the system 10, but other systems within the scope of the present disclosure may perform the method 200. At step 210, the alarm system 100 detects an alarm event. For example, the alarm system 100 may detect a fire, burglary, or medical emergency using one or more of the sensors of the alarm subsystem 102 or according to a button pressed on the keypad of the alarm panel 104. In other words, the alarm event may be responsive to the sensors of the alarm system 102 or an individual's request for attention using the alarm panel 104. At step 220, the alarm system 100 initiates a call to the CAMS 130 using the TA 108. In certain aspects, the initiation of the call by the alarm system 100 to the CAMS 130 includes the alarm system 100 opening a connection to the TA 108 via the communications link 152 and receiving a standard dial tone from the TA 108. Upon receiving the dial tone, the communications module 108 dials a telephone number of the CAMS 130 and waits for a connection. As noted above, while waiting for the connection to the opened, the alarm system 100 may receive "rings" from the TA 108, as would be common when placing a standard telephone call over PSTN networks.

As noted above, the TA 108 stores an address of the PTS 120, so that the TA 108 may connect to the PTS 120 over the data network 109. Upon receiving the telephone number of the CAMS 130 from the alarm system 100 at step 220, the TA 108 connects to the PTS 120 at step 230. That is, the PTS 120 opens a voice channel to the alarm system 100 using the TA 108 via communications link 154. In this manner, the alarm system 100 has established a voice channel between itself and the PTS 120. It is noted that, from the standpoint of the alarm system 100, the PTS 120 may appear to be the CAMS 130. In that context, as if the PTS 120 were the CAMS 130, the PTS 120 may be configured to send certain protocol and connection tones to the alarm system 100 upon establishing a voice channel to the alarm system 100.

After the voice channel between the alarm system 100 and the PTS 120 is established, the alarm system 100 communicates alarm event data to the PTS 120 at step 240. For example, the alarm system 100 may communicate alarm event data representative of the alarm event detected at step 210 to the PTS 120 at step 240 using one or more industry-standard Contact ID format codes. The alarm system 100 may also communicate information to the PBT 120 in addition to the alarm event data, such as an account number associated with the alarm system 100 and/or an identifier of the alarm system 100. The identifier may be a serial number of the alarm system 100, a serial number of the communications module 106, or another unique identifier associated with the alarm system 100.

After step 240, the process proceeds to step 250 where the PTS 120 communicates the alarm event data to the MPG 130. That is, at step 250, the PTS 120 communicates the alarm event data received from the alarm system 100 and, in certain cases, other associated data received from the alarm system 100 to the MPG 110 over the data network 109 via communications link 156. For example, the PTS 120 may communicate the telephone number of the CAMS 130 (as dialed by the alarm system 100) and the account number of the alarm system 100 to the MPG 130, when communicating the alarm event data to the MPG 130. It is also noted that, at step 230, when the TA 108 connects to the PTS 120 to open a voice channel, the TA 108 is identified by the PTS 120 according to its pseudo serial number, and the PTS 120 may communicate the alarm event data to the MPG 130 along with the pseudo serial number of the TA 108, for reference by the MPG 130, at step 250.

Figure 3:
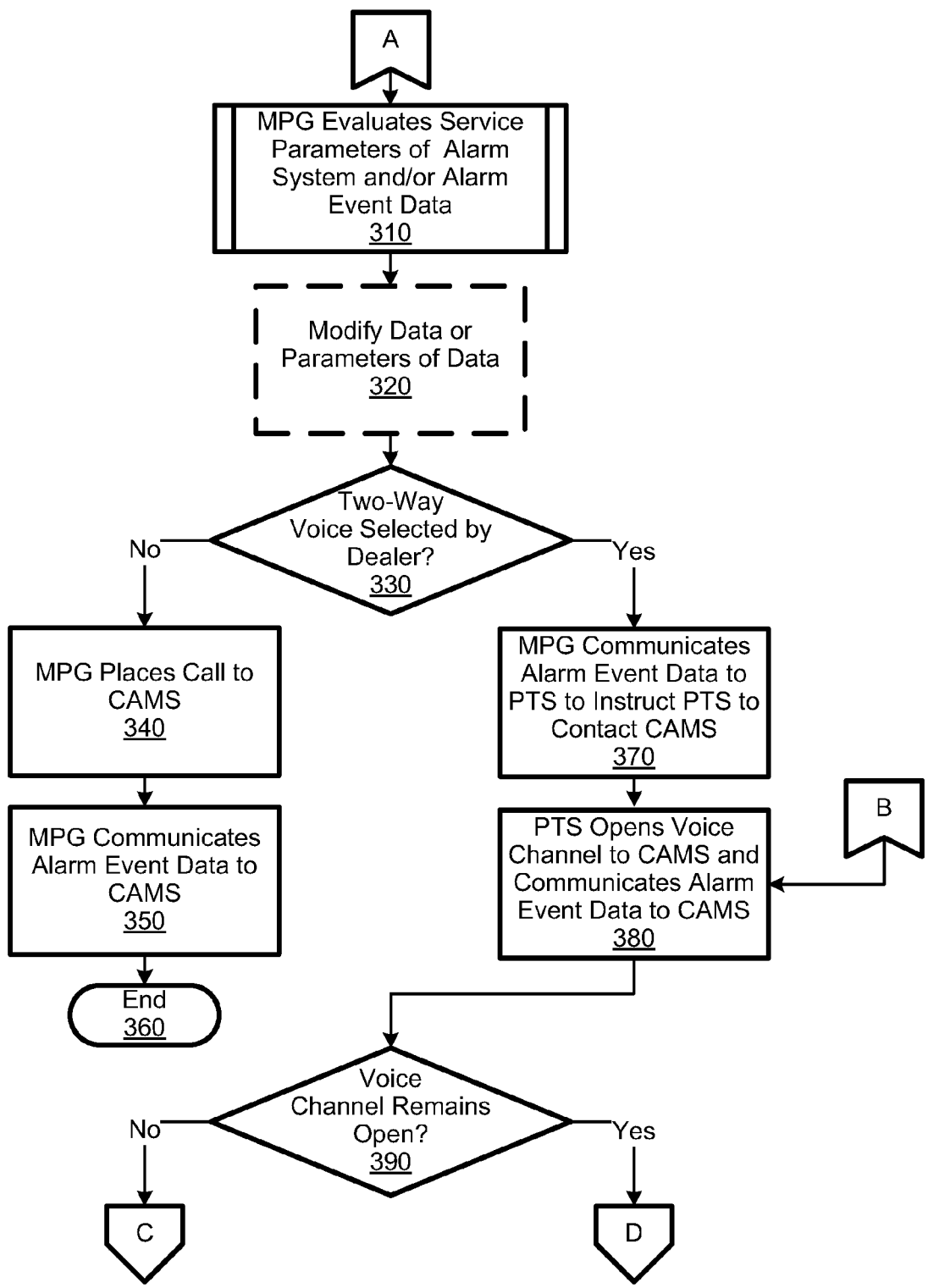
FIG. 3 further illustrates a process flow diagram of a method for delivering alarm system event data and connecting a two-way voice channel.

Referring to FIG. 3, the MPG 110 evaluates service parameters of the alarm system 110 and/or the alarm event data received from the alarm system 110 at step 310. Based on the evaluation at step 310, the MPG 110 determines whether to open a two-way voice channel. That is, at step 310, the MPG 110 determines whether to open the two-way voice channel based on whether certain service parameters of the alarm system 100 and/or conditions of the data received from the alarm system 100 are met, as described in further detail below with reference to FIG. 5.

At step 320, the MPG 110 may modify certain data or parameters of data received from the PTS 120 at step 240, if necessary. It is noted that step 320 is optional and the MPG 110 may not modify any data received from the alarm system 100, in certain cases where the data does not need to be modified. For example, if the MPG 110 maintains an updated or different telephone number for the CAMS 130 associated with the alarm system 100 in the database 116, the MPG 110 may replace the telephone number received from the alarm system 100 with the updated telephone number for the CAMS 130. That is, if the MPG 110 maintains an updated or different telephone number for the CAMS 130, the MPG 110 may use the updated telephone number for all subsequent steps in the method 200 in place of the telephone number received from the alarm system 100. As an additional or alternative example, if the MPG 110 maintains an updated or different account number associated with the alarm system 100 in the database 116, the MPG 110 may replace the account number received from the alarm system 100 with the updated account number for the alarm system 100. The MPG may also modify or replace alarm event data, such as Contact ID codes, if necessary, in certain embodiments. In this manner, as noted above, the MPG 110 provides additional flexibility in the system 10 as compared to conventional alarm systems. For example, if the alarm system 100 were to establish a communications link directly to the CAMS 130, the alarm system monitoring service provider of the alarm system 100 is limited in opportunities to intervene, monitor, or modify the communications between the alarm system 100 and the CAMS 130.

Proceeding to step 330, if the MPG 110 determined at step 310 that a voice channel is not to be opened between the alarm system 100 and the CAMS 130, the MPG 110 proceeds to step 340 and places a call to the CAMS 130 via the communications link 160. That is, the MPG 110 establishes a communications channel to the CAMS 130 via communications link 160 using the dialer bank 118 and the receiver module 132 at step 340. After establishing the communications channel at step 340, the MPG 110 communicates the alarm event data received from the alarm system 100 to the CAMS 130 at step 350. In one embodiment, the MPG 110 communicates the alarm event data to the CAMS 130 using DTMF tones. It is noted that the MPG 110 may communicate data to the central CAMS 130 in addition to the alarm event data. For example, the MPG 110 may query the database 116 at step 310 to gather and/or cross-reference data associated with the alarm system 100. In turn, the MPG 110 may communicate certain additional data queried from the database 116 to the CAMS 130 when communicating the alarm event data to the CAMS 130 at step 350.

Based on the alarm event data and any other associated information received from the MPG 110, the agent console 138 is updated with a display of the alarm event detected by the alarm system 100, and the process ends at step 360 after the CAMS 130 has received the alarm event data. In this case, no voice channel is connected between the alarm system 100 and the CAMS 130. As such, the agent 140 determines whether to contact emergency personnel such as police, fire, or medical personnel based on the updated display of the agent console 138 without the additional benefit of the voice channel.

Referring again to step 330, if the MPG 110 determined at step 310 that a voice channel is to be opened between the alarm system 100 and the CAMS 130, the MPG 110 proceeds to step 370 and communicates alarm event data to the PTS 120 and, thus, instructs the PTS 120 to contact the CAMS 130. At step 370, the MPG 110 communicates the data to the PTS 120 via the communications link 156 using a web services API, for example. In certain aspects, the MPG 110 communicates the data received from the PTS 120 at step 250 back to the PTS 120 at step 370. It is noted that, when the MPG 110 communicates the alarm event data back to the PTS 120 at step 370, the communication serves as an instruction to the PTS 120 to contact the CAMS 130. In that context, along with the alarm event data, the MPG 110 may also communicate the telephone number of the CAMS 130 received from the PTS 120 at step 250 back to the PTS 120 at step 370.

In certain embodiments, at step 330, the MPG 110 may communicate data back to the PTS 120 in addition to any data received from the PTS 120 at step 250. For example, the MPG 110 may query the database 116 at step 310 to gather and/or cross-reference data associated with the alarm system 100. In turn, the MPG 110 may communicate certain additional data queried from the database 116 to the PTS 120 when communicating the alarm event data to the PTS 120 at step 370. Further, some of the data communicated by the MPG 110 to the PTS 120 at step 370 may include data that was modified or updated by the MPG 110 at step 320, as described above.

Proceeding to step 380, the PTS 120 opens a voice channel with a receiver module of the CAMS 130 using the communications bank 124 via the communications link 158. The PTS 120 may open the voice channel with reference to the telephone number of the CAMS 130 received from the MPG 110 at step 370, for example. After opening the voice channel, the PTS 120 communicates the alarm event data and, in certain embodiments, other associated information received from the MPG 110 to the CAMS 130. In one embodiment, the PTS 120 communicates the alarm event data and an account number of the alarm system 100. Among embodiments, the PTS 120 may communicate any portion or all of the data received from the MPG 110 to the CAMS 130 at step 380.

At step 390, the PTS 120 determines whether the voice channel between the PTS 120 and the CAMS 130 remains open after an acknowledgement is returned from the CAMS 130 indicating that the alarm event data has been received. In other words, the PTS 120 determines whether the CAMS 130 has maintained an open communications channel via the communications link 158 after the CAMS 130 acknowledges receipt of the alarm event data from the PTS 120.

Figure 4:
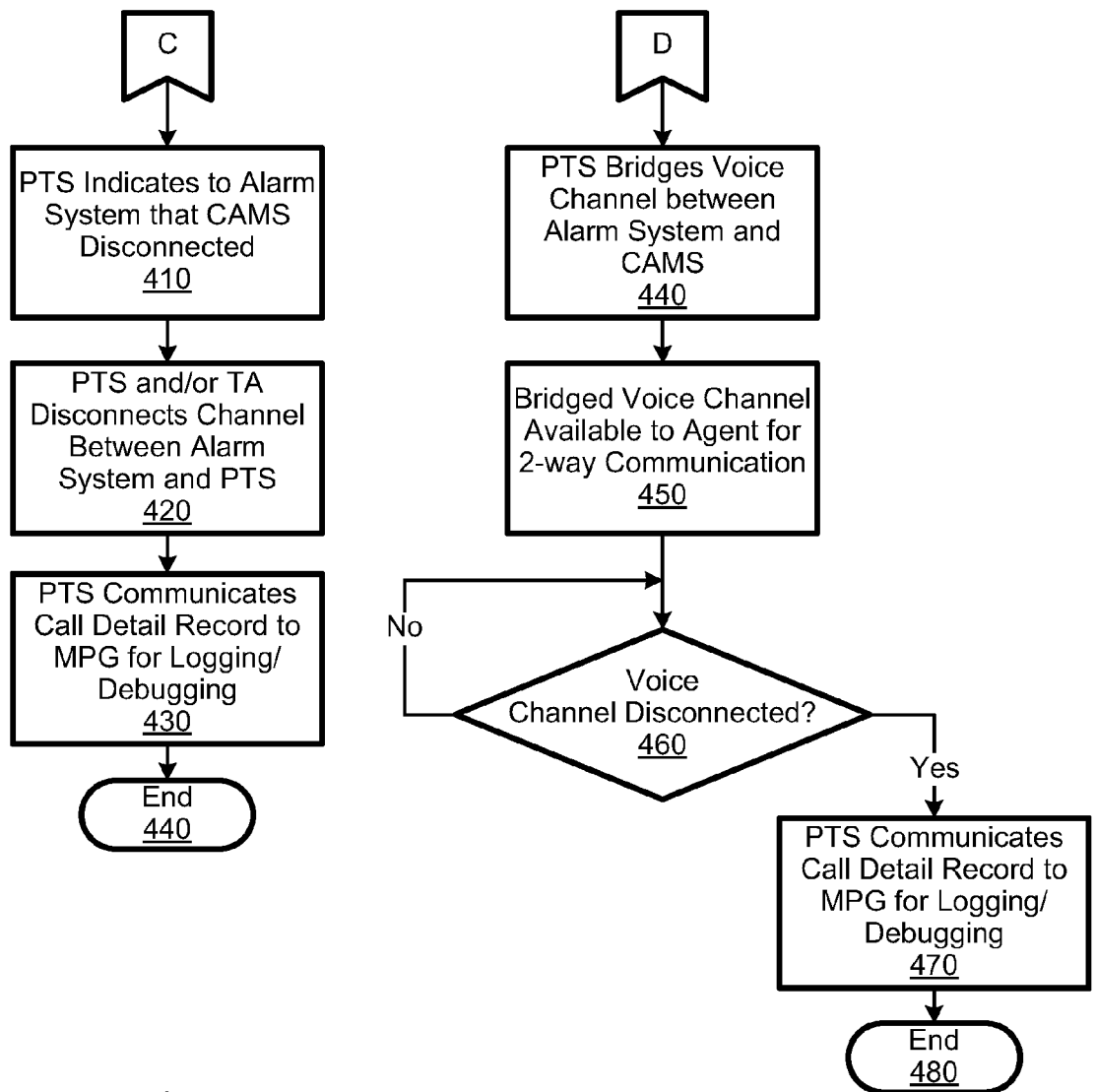
FIG. 4 further illustrates a process flow diagram of a method for delivering alarm system event data and connecting a two-way voice channel.

Referring between FIGS. 3 and 4, if the PTS 120 determines at step 390 that the voice channel between the PTS 120 and the CAMS 130 does not remain open after communication of the alarm event data to the CAMS 130 at step 380, the process proceeds to step 410 where the PTS 120 indicates to the alarm system 100 that the CAMS 130 has disconnected. For example, the PTS 120 may provide a PSTN "busy" signal to the alarm system 100 to indicate to the alarm system 100 that the CAMS 130 has disconnected.

Proceeding to step 420, the PTS 120 and/or the TA 108 disconnects the voice channel between the alarm system 100 and the PTS 120. After step 420, the PTS 120 communicates a call detail record to the MPG 110 including details regarding the communications (or attempted communications) between the alarm system 100 and the CAMS 130, for logging and/or debugging, at step 430. In certain aspects, it is noted that the MPG 110 may maintain a log of the communications and attempted communications between the alarm system 100 and the CAMS 130. To assist with the log, the MPG 110 uses, at least in part, call detail records received from the PTS 120 at step 430.

Referring again between FIGS. 3 and 4, if the PTS 120 determines at step 390 that the CAMS 130 maintains an open voice channel after receipt of the alarm event data, the process proceeds to step 440, where the PTS 120 bridges the voice channel established between the alarm system 100 and the PTS 120 at step 230 with the voice channel established between the PTS 120 and the CAMS 130 at step 380. Thus, a voice channel between the alarm system 100 and the CAMS 130 is created at step 440. After the voice channel is bridged between the alarm system 100 and the CAMS 130, at step 450, the agent 140 is able to speak into a headset or handset microphone at the CAMS 130 and the agent's voice may be amplified over the speakers of the alarm system 100. Additionally, the agent 140 is able to listen for sounds at a location where the alarm system 100 is installed using a microphone of the alarm system 100. The bridged voice channel continues until it is determined to be disconnected by either the alarm system 100 or the CAMS 130 at step 460. After the bridged voice channel is disconnected, in certain embodiments, the PTS 120 communicates a call detail record to the MPG 110 including details regarding the communications between the alarm system 100 and the CAMS 130, for logging and/or debugging, at step 470. The process ends at step 430 when the bridged voice channel is disconnected.

Figure 5:
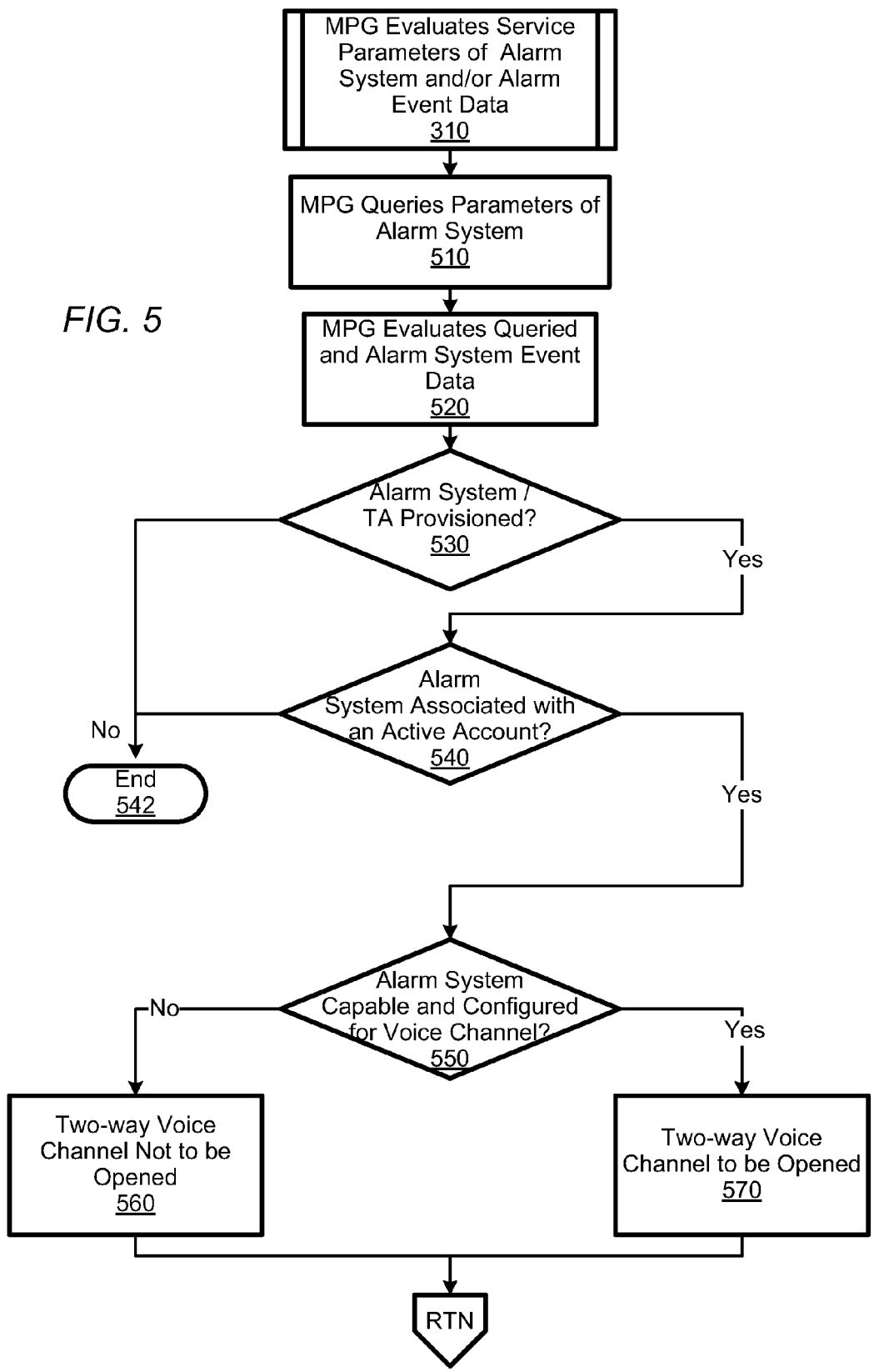
FIG. 5 illustrates a process flow diagram of a method for evaluating service parameters of an alarm system and/or alarm event data.

Turning to FIG. 5, a process flow diagram of the step 310 of evaluating service parameters of an alarm system and/or alarm event data is described in further detail. Generally, the evaluation is relied upon to determine whether a two-way voice channel is to be opened between the alarm system 100 and the CAMS 130. The decision blocks in the evaluation illustrated in FIG. 5 are provided by way of example only, and embodiments may be implemented using fewer or additional factors, decisions, or considerations.

At step 510, the processor 114 of the MPG 110 queries data associated with the alarm system 100 from the database 116. Particularly, the processor 114 queries the database 116 for various types of data associated with the alarm system 100, such as account numbers, service parameters, billing information, subscriber names, serial numbers, IP addresses, and other service parameters of the alarm system 100. At step 520, the MPG 110 evaluates the data queried from the database 116 at step 510 and the alarm system event data received from the PTS 120 at step 240.

After the query at step 510 and the evaluation at step 520, the post-processor 116 determines whether a two-way voice channel is to be opened at decisions blocks 530, 540, and 550. At step 530, the processor 114 determines whether the alarm system 100 and/or the TA 108 are provisioned in the database 116. In other words, the processor 114 may determine whether the alarm system 100 is registered among a known group of serviced alarm systems of the MPG 110. Similarly, the processor 114 may determine whether the TA 108 is registered among a known group of TAs serviced by the MPG 110. To determine whether the alarm system 100 is provisioned, the processor 114 may reference the serial number of the alarm system 100 and cross-reference it with information in the database 116. Additionally or alternatively, to determine whether the TA 108 is provisioned, the processor 114 may reference the pseudo serial number or manufacturer's serial number of the TA 108 and cross-reference it with information in the database 116. If the alarm system 100 is not among the known group of serviced alarm systems of the MPG 110, the process ends at step 542. Similarly, if the TA 108 is not among the known group of serviced TAs, the process ends at step 542. It is noted that, when the process ends at step 542, no communication with the CAMS 130 occurs although the alarm system 100 contacted the PTS 120. Particularly, when the process ends at step 542, the MPG 110 does not contact the CAMS 130 at step 340 and the PTS does not contact the CAMS at step 380. Instead, the MPG 110 fails to communicate any alarm event data back to the PTS 120 at step 370 and, thus, the PTS 120 has no instructions to contact the CAMS 130. In this case, the process ends without the CAMS 130 being contacted. In general, no connection between the alarm system 100 and the CAMS 130 is permitted or authorized by the MPG 110, because the alarm system 100 is not a provisioned customer. Alternatively, if the alarm system 100 is among the known serviced alarm systems, the process proceeds to step 540.

At step 540, the processor 114 determines whether the alarm system 100 is associated with an active alarm monitoring account. In other words, the processor 114 determines whether the alarm system 100 is associated with a customer account in good standing, for example. Among other aspects, the standing of a customer's account may be dependent upon an account balance for services rendered or a payment schedule of the customer. If the alarm system 100 is not associated with a customer account in good standing, the processor 114 proceeds to step 542 and the process ends at step 542 as described above. In this case, no connection between the alarm system 100 and the CAMS 130 is permitted or authorized by the MPG 110, because the alarm system 100 is associated with a customer account that is not in good standing. Alternatively, if the alarm system 100 is associated with a customer account in good standing, the process proceeds to step 550.

At step 550, the processor 114 determines whether the alarm system 100 is capable of and configured for establishing a two-way voice channel between the alarm system 100 and the CAMS 130. In one aspect, at step 550, the processor 114 determines whether the alarm system 100 comprises the hardware necessary to facilitate the establishment of a voice channel. The processor 114 may cross-reference the pseudo serial number or manufacturer's a serial number of the alarm system 100 with data stored in the database 116 to determine whether the alarm system 100 comprises the hardware required to establish a voice channel. In this context, the database 116 may store a list of hardware configurations of several different models of alarm systems which comprise the hardware necessary to establish a voice channel for reference by the processor 114.

In another aspect, at step 550, the processor 114 determines whether the alarm system 100 is configured for two-way voice functionality. It is noted that, although an alarm system may comprise the hardware necessary to establish a voice channel, customers and/or service providers may choose not to use the two-way voice functionality of the alarm system. Even for alarm systems comprising the hardware necessary for establishing a voice channel, the voice feature may be disabled at the alarm panel of the alarm system or according to one or more parameters stored in the database 116, for example. As noted above, the dealer 180 may access the MPG 110 and set or update the service parameters of the alarm system 100 either before or after the initial installation of the alarm system 100. For example, the dealer 180 may access the MPG 110 and set whether two-way voice functionality is currently active for the alarm system 100. If the alarm system 100 does not comprise the hardware necessary for establishing a voice channel or is not configured for two-way voice functionality, the processor 114 proceeds to step 560 and it is determined that no two-way voice channel is to be opened. Alternatively, if the alarm system 100 comprises the hardware necessary for establishing a voice channel and is configured for two-way voice functionality, the process proceeds to step 570.

Thus, during the evaluation illustrated in FIG. 5 (i.e., during step 310 of FIG. 3), the MPG 110 determines whether to open a voice channel between the alarm system 100 and the CAMS 130. As noted above, the voice channel is not opened automatically for all alarm events of the alarm system 100. For example, as discussed above, even if a burglary is detected, no voice channel is opened if the alarm system 100 is not provisioned, is not associated with a customer account in good standing, or is not configured for two-way voice functionality by the dealer 180. With reference again to FIG. 3, after the evaluation in FIG. 5, the process turns to either step 340 when no voice channel is to be opened or to step 370 when a voice channel is to be opened, according to the decision at step.

Returning to FIG. 3 for a discussion of aspects of an additional embodiment, before proceeding from step 240 to step 250, the PTS 120 may optionally determine, at step 252, whether pass-through mode is set at the PTS 120. Particularly, the PTS 120 may be set by the MPG 110 to operate in pass-through mode. The PTS 120 is configured, if set to operate in pass-through mode, to communicate the alarm event data received from the alarm system 100 directly to the CAMS 130, without (or with minimal) communication with the MPG 110 beforehand. If the PTS 120 determines that pass-through mode is enabled at step 252, the process proceeds directly to step 380 of FIG. 3, where the PTS 120 opens a voice channel to the CAMS 130 and communicates the alarm event data received from the alarm system 100 to the CAMS 130. In this case, the evaluation by the MPG 110 at step 310 is bypassed. In some embodiments, even when the PTS 120 determines at step 252 that pass-through mode is set, the PTS 120 may still communicate certain information to the MPG 110. For example, the PTS 120 may still communicate the telephone number dialed by the alarm system 100 using the TA 108 to the MPG 110, so that the MPG 110 may at least determine whether the telephone number is a valid telephone number of a central alarm monitoring station. In this respect, the MPG 110 may be configured to give the PTS 120 a reduced-evaluation "go" or "no go" with regard to whether the PTS 120 should proceed to contact the central alarm monitoring station dialed by the alarm system 100.

As discussed above, the alarm system 100 stores the telephone number of the CAMS 130 and places a call to the CAMS 130 at step 220 when an alarm event is detected. However, according to the method for delivering alarm system event data and connecting a two-way voice channel 200, when the alarm system 100 dials the telephone number of the CAMS 130 using the TA 108, the TA 108 connects to the PTS 120 rather than to the CAMS 130. In this context, it is noted that the steps performed by the MPG 110 and the PTS 120 are intermediary between any step of establishing a connection between the alarm system 100 and the CAMS 130. The steps performed by the MPG 110 and the PTS 120 add additional flexibility to conventional methods of delivering alarm system event data. For example, if the alarm system 100 were to establish a communications link directly to the CAMS 130, the alarm system monitoring service provider of the alarm system 100 may be limited in opportunities to intervene, monitor, or modify the communications between the alarm system 100 and the CAMS 130, as noted above. Based on the steps of the method 200, a service provider has additional options to intervene, monitor, or modify communications between the alarm system 100 and the CAMS 130, as may be needed from time to time under various circumstances.

Figure 6:
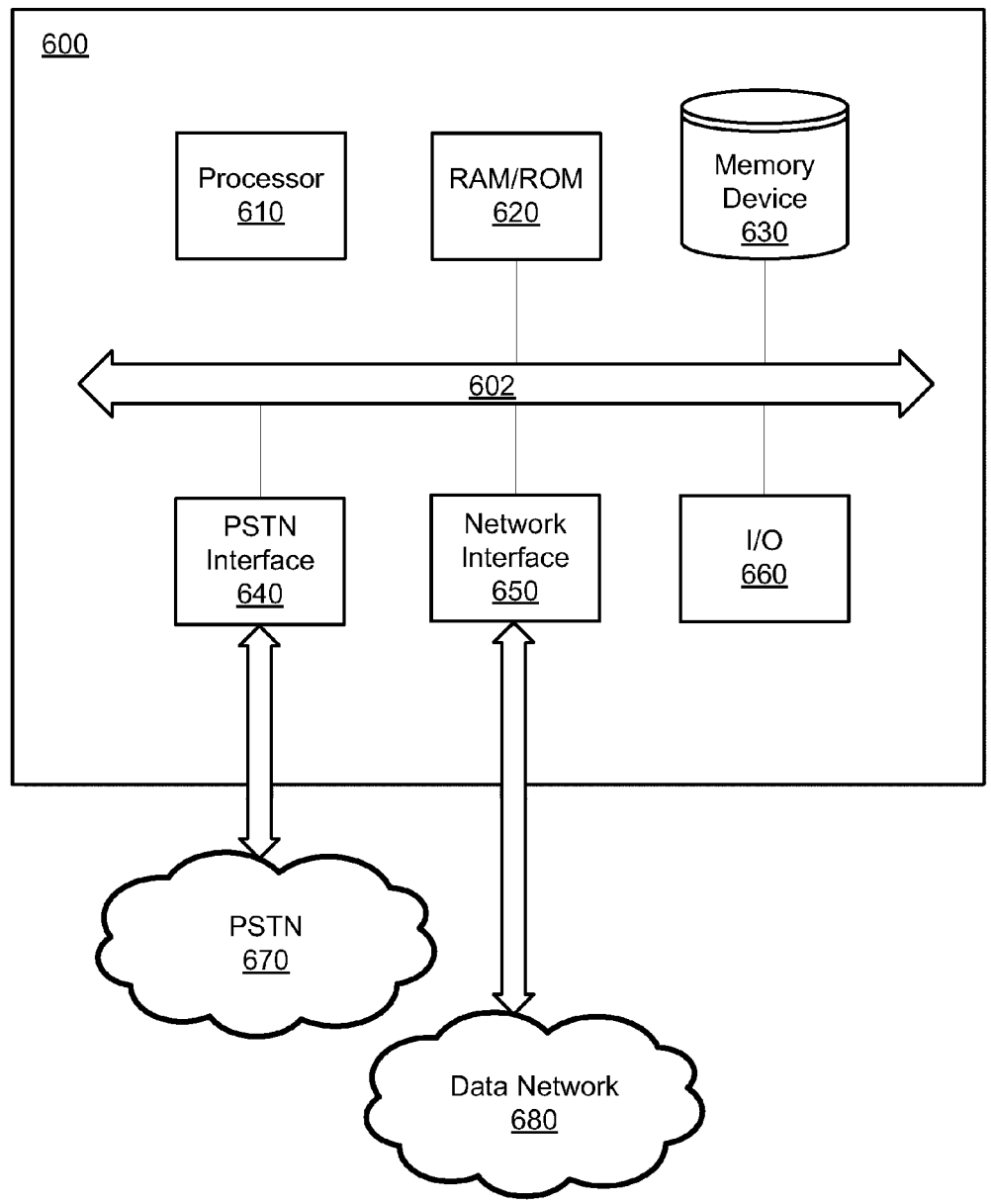
FIG. 6 illustrates a general purpose computer to implement one or more elements of a system for efficient delivery of alarm system event data and audio.

Turning to FIG. 6, an example hardware diagram of a general purpose computer 600 is illustrated. Any of the alarm system 100, the MPG 110, the PTS 120, and the CAMS 130 may be implemented, in part, using one or more elements of the general purpose computer 600. The computer 600 includes a processor 610, a Random Access Memory ("RAM")/Read Only Memory ("ROM") 620, a memory device 630, a PSTN interface 640, a network interface 650, and an Input Output ("I/O") interface 660. The elements of the computer 600 are communicatively coupled via a bus 602.

The processor 610 comprises any well known general purpose arithmetic processor or Application Specific Integrated Circuit ("ASIC"). The RAM/ROM 620 comprises any well known random access or read only memory device that stores computer-readable instructions to be executed by the processor 610. The memory device 630 stores computer-readable instructions thereon that, when executed by the processor 610, direct the processor 610 to execute various aspects of the present invention described herein. When the processor 610 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 630 comprises one or more of an optical disc, a magnetic disc, a semiconductor memory (i.e., a flash based memory), a magnetic tape memory, a removable memory, combinations thereof, or any other known memory means for storing computer-readable instructions. The PSTN interface 640 and the network interface 650 comprise hardware interfaces to communicate over the PSTN and data networks, respectively. The I/O interface 660 comprises device input and output interfaces such as keyboard, pointing device, display, communication, and other interfaces. The bus 602 electrically and communicatively couples the processor 610, the RAM/ROM 620, the memory device 630, the PSTN interface 640, the network interface 650, and the I/O interface 660, so that data and instructions may be communicated among them. In operation, the processor 610 is configured to retrieve computer-readable instructions stored on the memory device 640, the RAM/ROM 620, or another storage means, and copy the computer-readable instructions to the RAM/ROM 620 for execution. The processor 610 is further configured to execute the computer-readable instructions to implement various aspects and features of the present invention. For example, the processor 610 may be adapted and configured to execute the processes described above with reference to FIGS. 3-5, including the processes described as being performed by the post-processor 116. Also, the memory device 630 may store the data stored in the database 116.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method for delivery of alarm system event data and audio, comprising:
    detecting, by an alarm system, an alarm event;
    communicating, by the alarm system, alarm event data to a private telecommunications switch, the alarm event data being representative of the alarm event;
    communicating, by the private telecommunications switch, the alarm event data to a message processing gateway;
    evaluating, by the message processing gateway, whether the alarm system is registered among a known group of alarm systems serviced by the message processing gateway;
    instructing, by the message processing gateway, the private telecommunications switch to contact a central alarm monitoring station if the alarm system is deemed registered among the known group of alarm systems serviced by the message processing gateway;
    in response to the instructions to contact the central alarm monitoring station, opening, by the private telecommunications switch, a Public Switched Telephone Network (PSTN) voice channel between the private telecommunications switch and the central alarm monitoring station and communicating the alarm event data to the central alarm monitoring station;
    determining, by the private telecommunications switch, whether the PSTN voice channel between the private telecommunications switch and the central alarm monitoring station remains open after communication of the alarm event data to the central alarm monitoring station; and
    in response to determining that the PSTN voice channel between the private telecommunications switch and the central alarm monitoring station remains open, bridging, by the private telecommunications switch, the PSTN voice channel between the private telecommunications switch and the central alarm monitoring station to the alarm system, to create a voice channel between the alarm system and the central alarm monitoring station.

2. The method of claim 1, further comprising
    initiating, by the alarm system, a call to the central alarm monitoring station using an telephone adapter in response to the alarm event; and
    connecting, by the telephone adapter, to the private telecommunications switch and opening a voice channel between the alarm system and the private telecommunications switch based on the call initiated by the alarm system, wherein
    bridging the voice channel to the alarm system comprises bridging, by the private telecommunications switch, the voice channel between the alarm system and the private telecommunications switch with the PSTN voice channel between the private telecommunications switch and the central alarm monitoring station, to create the voice channel between the alarm system and the central alarm monitoring station.

3. The method of claim 2, wherein
    initiating the call to the central alarm monitoring station by the alarm system comprises initiating the call to the central alarm monitoring station according to a telephone number of the central alarm monitoring station, and
    communicating the alarm event data to the message processing gateway by the private telecommunications switch further comprises communicating an identifier of the telephone adapter and the telephone number to the message processing gateway.

4. The method of claim 3, further comprising:
    determining, by the message processing gateway, whether the alarm system or the telephone adapter is provisioned at the message processing gateway;
    determining, by the message processing gateway, whether the alarm system is associated with an active customer account; and
    determining, by the message processing gateway, whether the alarm system is capable and configured for a two-way voice channel.

5. The method of claim 1, further comprising communicating, by the message processing gateway, the alarm event data to the central alarm monitoring system if the alarm system is deemed not registered among the known group of alarm systems serviced by the message processing gateway.

6. The method of claim 1, further comprising, in response to determining that the PSTN voice channel between the private telecommunications switch and the central alarm monitoring station has not remained open, indicating to the alarm system, by the private telecommunications switch to the alarm system, that the central alarm monitoring station has disconnected.

7. The method of claim 1, further comprising modifying, by the message processing gateway, data received from the private telecommunications switch, before instructing the private telecommunications switch to contact the central alarm monitoring station.

8. The method of claim 7, further comprising communicating, by the message processing gateway, the modified data to the private telecommunications switch, before instructing the private telecommunications switch to contact the central alarm monitoring station.

9. A system for delivery of alarm system event data and connecting a voice channel, comprising:
    an alarm system configured to
        detect an alarm event, and
        communicate alarm event data representative of the alarm event;
    a message processing gateway configured to
        receive the alarm event data from the alarm system,
        evaluate whether the alarm system is configured for two-way voice functionality, and
        send instructions to contact a central alarm monitoring station if the alarm system is deemed configured for two-way voice functionality; and
    a private telecommunications switch configured to
        open a Public Switched Telephone Network (PSTN) voice channel between the private telecommunications switch and the central alarm monitoring station and communicate the alarm event data to the central alarm monitoring station, in response to the instructions to contact the central alarm monitoring station,
        determine whether the PSTN voice channel between the private telecommunications switch and the central alarm monitoring station remains open after communication of the alarm event data to the central alarm monitoring station, and
        bridge the PSTN voice channel between the private telecommunications switch and the central alarm monitoring station to the alarm system, to create a voice channel between the alarm system and the central alarm monitoring station, in response to a determination that the PSTN voice channel between the private telecommunications switch and the central alarm monitoring station remains open.

10. The system of claim 9, wherein
the alarm system is further configured to
    initiate a call to the central alarm monitoring station using a telephone adapter in response to the alarm event, and
    connect to the private telecommunications switch and open a voice channel between the alarm system and the private telecommunications switch using the telephone adapter based on the call initiated by the alarm system, and
the private telecommunications switch is further configured to bridge the voice channel between the alarm system and the private telecommunications switch with the PSTN voice channel between the private telecommunications switch and the central alarm monitoring station, to create the voice channel between the alarm system and the central alarm monitoring station.

11. The system of claim 10, wherein
the alarm system is further configured to initiate the call to the central alarm monitoring station according to a telephone number of the central alarm monitoring station, and
the private telecommunications switch is further configured to
    receive the alarm event data from the alarm system, and
    communicate the alarm event data and an identifier of the telephone adapter to the message processing gateway.

12. The system of claim 11, wherein the message processing gateway is further configured to
    determine whether the alarm system or the telephone adapter is provisioned,
    determine whether the alarm system is associated with an active customer account, and
    determine whether the alarm system is capable and configured for a two-way voice channel.

13. The system of claim 9, wherein the message processing gateway is further configured to communicate the alarm event data to the central alarm monitoring system if the alarm system is deemed not configured for two-way voice functionality.

14. The system of claim 9, wherein the private telecommunications switch is further configured to indicate to the alarm system that the central alarm monitoring station has disconnected, in response to a determination that the PSTN voice channel between the private telecommunications switch and the central alarm monitoring station has not remained open.

15. The system of claim 9, wherein the message processing gateway is further configured to modify data received from the private telecommunications switch, before sending the instructions to contact the central alarm monitoring station.

16. The system of claim 15, wherein the message processing gateway is further configured to communicate the modified data to the private telecommunications switch, before sending the instructions to contact the central alarm monitoring station.

17. An apparatus for delivery of alarm system event data and connecting a voice channel, comprising:
    a message processing gateway configured to
        receive alarm event data from an alarm system,
        evaluate whether the alarm system is associated with a customer account that is active and in good standing with respect to account balance for services rendered or payment schedule, and
        send instructions to contact a central alarm monitoring station if the alarm system is deemed to be associated with the customer account that is active and in good standing; and
    a private telecommunications switch configured to
        open a Public Switched Telephone Network (PSTN) voice channel between the private telecommunications switch and the central alarm monitoring station and communicate the alarm event data to the central alarm monitoring station, in response to the instructions to contact the central alarm monitoring station,
        determine whether the PSTN voice channel between the private telecommunications switch and the central alarm monitoring station remains open after communication of the alarm event data to the central alarm monitoring station, and
        bridge the PSTN voice channel between the private telecommunications switch and the central alarm monitoring station to the alarm system, to create a voice channel between the alarm system and the central alarm monitoring station, in response to a determination that the PSTN voice channel between the private telecommunications switch and the central alarm monitoring station remains open.

18. The apparatus of claim 17, wherein the private telecommunications switch is further configured to
    open a voice channel between the alarm system and the private telecommunications switch using a telephone adapter, and
    bridge the voice channel between the alarm system and the private telecommunications switch with the PSTN voice channel between the private telecommunications switch and the central alarm monitoring station, to create the voice channel between the alarm system and the central alarm monitoring station.

19. The apparatus of claim 18, wherein the private telecommunications switch is further configured to
    receive the alarm event data from the alarm system, and
    communicate the alarm event data and an identifier of the telephone adapter to the message processing gateway.

20. The apparatus of claim 19, wherein the message processing gateway is further configured to
    determine whether the alarm system or the telephone adapter is provisioned, and
    determine whether the alarm system is capable and configured for a two-way voice channel.

21. The apparatus of claim 17, wherein the message processing gateway is further configured to communicate the alarm event data to the central alarm monitoring system if the alarm system is deemed to be not associated with the customer account that is active and in good standing.

22. The apparatus of claim 17, wherein the private telecommunications switch is further configured to indicate to the alarm system that the central alarm monitoring station has disconnected, in response to a determination that the PSTN voice channel between the private telecommunications switch and the central alarm monitoring station has not remained open.

23. The apparatus of claim 17, wherein the message processing gateway is further configured to modify data received from the private telecommunications switch, before sending the instructions to contact the central alarm monitoring station.

24. The apparatus of claim 23, wherein the message processing gateway is further configured to communicate the modified data to the private telecommunications switch, before sending the instructions to contact the central alarm monitoring station.

* * * * *